United States Patent
Linder et al.

(10) Patent No.: US 7,207,596 B2
(45) Date of Patent: Apr. 24, 2007

(54) MOTOR VEHICLE WITH A BODY STRUCTURE AND WITH A SIDE IMPACT PROTECTION DEVICE

(75) Inventors: Leo Linder, Voehringen (DE); Frank Mueller, Leonberg (DE); Peter Tiefenthaler, Munich (DE)

(73) Assignees: Dr. Ing h.c.F. Porsche Aktiengesellschaft, Stuttgart (DE); Autoliv Development AB, Vargarda (SE)

( * ) Notice: Subject to any disclaimer, the term of this patent is extended or adjusted under 35 U.S.C. 154(b) by 0 days.

(21) Appl. No.: 11/481,027

(22) Filed: Jul. 6, 2006

(65) Prior Publication Data

US 2007/0040364 A1    Feb. 22, 2007

Related U.S. Application Data

(63) Continuation of application No. 10/729,374, filed on Dec. 8, 2003, now abandoned.

(51) Int. Cl.
*B60R 21/16* (2006.01)

(52) U.S. Cl. .................................. 280/730.2; 280/729
(58) Field of Classification Search ............. 280/730.2, 280/729
See application file for complete search history.

(56) References Cited

U.S. PATENT DOCUMENTS

| 5,556,128 A | 9/1996 | Sinnhuber et al. |
| 5,636,862 A | 6/1997 | Cheung et al. |
| 5,678,852 A | 10/1997 | Brown et al. |
| 6,113,135 A * | 9/2000 | Tsutsumi ................. 280/730.2 |
| 6,302,436 B1 * | 10/2001 | Eyrainer ................. 280/730.2 |

FOREIGN PATENT DOCUMENTS

| DE | 4304152 A1 | 8/1993 |
| DE | 4409770 A1 | 9/1995 |
| DE | 196 46 698 A1 | 5/1997 |
| DE | 19646698 | 5/1997 |
| DE | 29822159 U1 | 6/1999 |
| DE | 10020920 A1 | 10/2001 |
| JP | 5-139232 | * 6/1993 |

OTHER PUBLICATIONS

Forms PTO-1449 and PTO-892 from parent application.

* cited by examiner

*Primary Examiner*—Eric Culbreth
(74) *Attorney, Agent, or Firm*—Crowell & Moring LLP

(57) ABSTRACT

A motor vehicle includes a body structure that has a lateral structure, a vehicle seat that is mounted on the body structure, and a side impact protection device for a passenger in the vehicle. The side impact protection device includes a head airbag with a first inflation device that can deploy upward in the region of the breastwork of the lateral structure, and a side airbag with a second inflation device that can deploy laterally out of the seat. In order for the side impact protection device to be used for different body structures, the side airbag is designed as a thorax airbag, which, in its ready state, is positioned, together with the second inflation device, inside the seat back of the vehicle seat, and can deploy essentially toward the front out of the side wall of the seat back. When the thorax airbag is in its deployed state, its upper edge comes to rest next to the breastwork of the lateral structure.

8 Claims, 1 Drawing Sheet

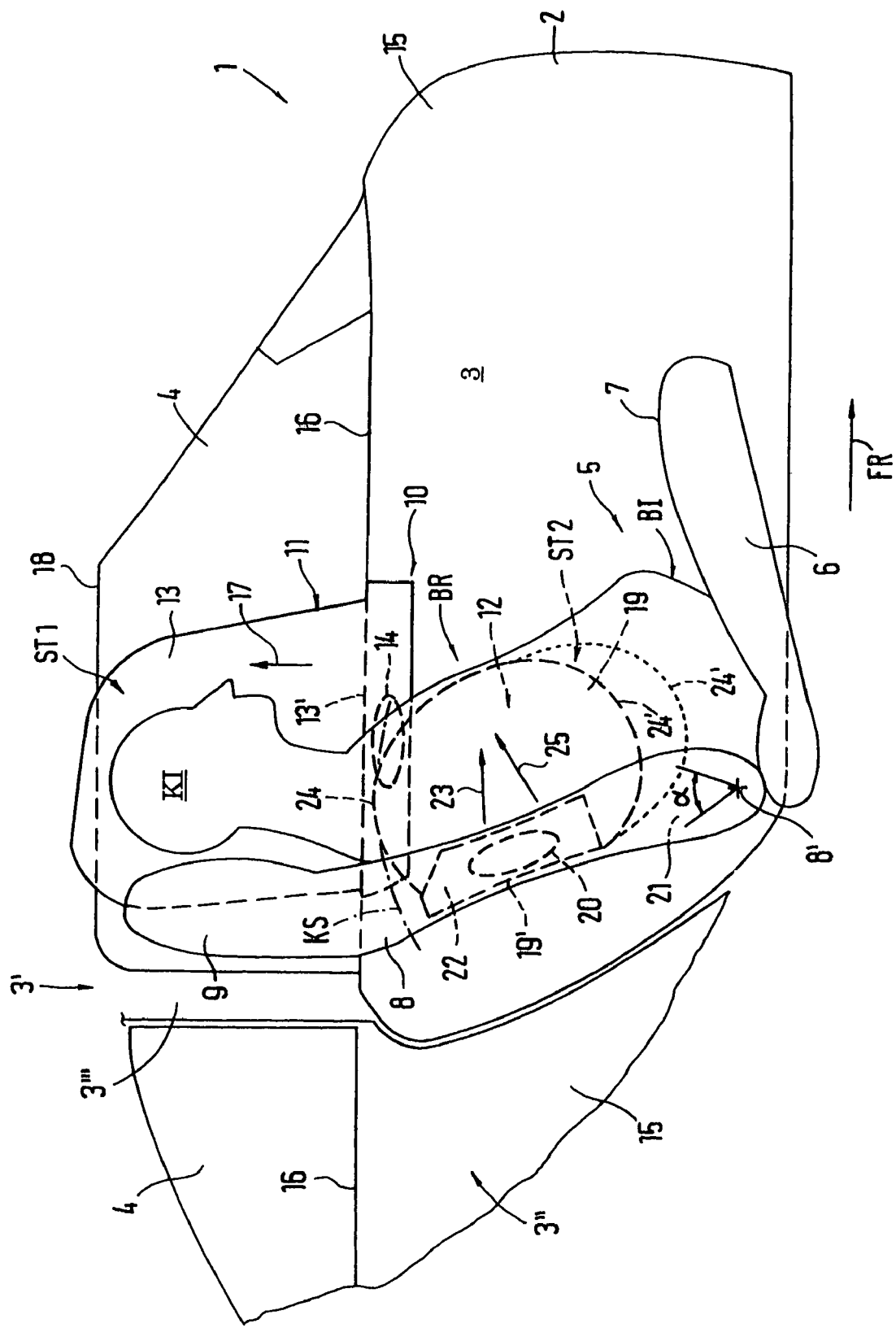

MOTOR VEHICLE WITH A BODY STRUCTURE AND WITH A SIDE IMPACT PROTECTION DEVICE

This application is a continuation of U.S. patent application Ser. No. 10/729,374, filed Dec. 8, 2003 now abandoned, the disclosure of which is expressly incorporated by reference herein.

This application also claims the priority of German application 102 57 248.8, filed Dec. 7, 2002.

Cross-reference is hereby made to U.S. patent application Ser. No. 10/729,378, titled SAFETY SYSTEM FOR OCCUPANTS OF A MOTOR VEHICLE, filed Dec. 8, 2003, naming two inventors of the present invention as co-inventors.

BACKGROUND AND SUMMARY OF THE INVENTION

The present invention relates to a motor vehicle comprising a body structure that has lateral structure having a side door, a vehicle seat that is mounted on the body structure, and a side impact protection device for a passenger in the vehicle. The side impact protection device includes a head airbag, with a first inflation device that can deploy upward in a region of breastwork of the lateral structure, and a side airbag, with a second inflation device that can deploy laterally from the seat.

A motor vehicle known from German publication DE 43 04 152 A1 has a body structure that comprises a lateral structure with a side door. On the body structure, specifically on its underbody, a vehicle seat is mounted. A side impact protection device provided for a passenger inside the vehicle comprises two separate airbags, each with its own inflation device. One of the airbags is designed as a head airbag, and deploys upward in the area of the breastwork of the side door, in other words, toward the roof of the body structure. In the known vehicle, the second airbag with its inflation device is positioned on the seat, below the seat surface, and forms a side airbag to protect the vehicle passenger's thigh that is adjacent to the door.

An object of the invention is to provide a motor vehicle of this type in which the side impact protection device is optimized and can be used in vehicles having different body structures.

This object is attained by way of a motor vehicle in which the side airbag is designed as a thorax airbag that, in a ready position, is arranged, together with the second inflation device, inside a seat back of the vehicle seat, and that can deploy out of a side wall of the seat back essentially toward a front, and in which, when the thorax airbag is in its deployed state, its upper edge comes to rest next to the breastwork of the lateral structure. Further features that serve to characterize the invention form the subject matter of dependent claims. A process of using a side impact protection device is also claimed.

One principle benefit achieved with the invention is that with separate implementation of the head airbag and the thorax airbag, each with its own multistage inflation device, the pyrotechnic and/or gaseous charges in the inflation devices can be low. In addition, the inflation pressures can be reduced in comparison with large-volume airbags that are designed to protect both head and thorax with a single cushion. Furthermore, a side impact protection device pursuant to the invention can be used both for closed vehicles, such as sedans or coupes, and for open vehicles that have no longitudinal roof beam or whose roof beam is not suited to accepting an airbag. Since, when the thorax airbag is inflated, its upper edge lies next to the breastwork of the lateral structure, the activated airbags essentially provide continuous side impact protection, so that both the head and the chest area are seamlessly covered in the event of a side collision.

According to a further feature of the invention, the thorax airbag that deploys from the seat back does not collide with the passenger's safety belt device, because it can be effectively positioned within the triangle spanned by the safety belt between the upper and lower anchorage points.

According to one preferred embodiment, the thorax airbag is deployed from the deployment opening at an upward angle in the direction of the breastwork, so that it extends up to the head airbag that is deployed from the breastwork.

It is advantageous that there is sufficient space in the lateral structure for other built-in components, since the head airbag module, comprising the head airbag and its inflation device, lies directly below the breastwork.

According to a further development, it is advantageous that, in comparison with other known side impact protection devices (German publication DE 44 09 770 A1), in which, when the airbag inflates, a component of force is exerted in the direction of the passenger, the side impact protection device of the invention has this component of force to a small degree.

The lower edge of the thorax airbag can extend up to the pelvic region, so that a combined cushion for the thorax and the pelvic region is formed.

BRIEF DESCRIPTION OF THE DRAWING

The invention will be described in greater detail below using exemplary embodiments with reference to the drawing. The sole FIGURE is a sectional illustration of a motor vehicle with a lateral structure, a body structure, a vehicle seat, and a side impact protection device.

DETAILED DESCRIPTION OF THE INVENTION

In a motor vehicle 1, illustrated here in part and designed specifically as a passenger sports car with a body structure 2, a lateral structure 3' having at least one side door 3 and a rear side component 3", if applicable with a B—column 3''', is shown. The lateral structure 3' possesses at least one movable side window 4 in the side door 3, and preferably in the rear side component 3" as well. A front vehicle seat 5 is mounted on the body structure 2 and can be shifted specifically on an underbody of the body structure 2, not illustrated here, in the longitudinal direction of the vehicle. The vehicle seat 5 is equipped with a seat element 6 equipped with a seat surface 7 and an essentially perpendicular seat back 8, which bears a headrest 9 that may be integrated. The tilt of the seat back 8 can be adjusted around a lower pivoting axis 8'. A rear seat (not illustrated here) can be positioned behind the front vehicle seat 5 and mounted on the body structure 2 next to the partially illustrated rear side component 3". The rear side component 3" can, if applicable, be equipped with a side door.

The motor vehicle 1 is further equipped with a side impact protection device 10 for each of one or more seats 5, which protection device comprises a head protection module 11 and a thorax protection module 12. The head protection module 11 is comprised of a head airbag 13, designed as an inflatable cushion, and a first inflation device 14, specifically a gas generator.

The side impact protection device 10 will be described below in conjunction with the front vehicle seat 5, purely by way of example, although this side impact protection device 10 may also be allocated to the rear seat. The head protection module 11 is positioned in the lateral structure 3', for example the side door 3, between the external sheet panel and the interior paneling 15 of the lateral structure 3', directly below the breastwork 16 or adjacent thereto. In this manner, the head airbag 13 can be deployed upward (Arrow 17) between the side window 4 and the interior paneling 15 on the breastwork 16, parallel to the side window 4. In this manner also, the lower edge 13' of the head airbag 13 can come to rest near the breastwork 16. The interior paneling 15 can fold away in the direction of the vehicle seat 5, so that the head airbag will deploy only upward and parallel to the side window 4, without expanding significantly in the direction of the vehicle seat 5. In the exemplary embodiment shown here, the head protection module 11—viewed in the direction of travel FR—is positioned generally in the rear half of the side door 3, so that the head airbag 13 can deploy generally within this half of the side door 3 from its folded ready position, and when it is in an inflated or deployed state ST1, will extend beyond the head K1 of the passenger; in other words it will extend up to the upper edge 18 of the side window 4, or will extend slightly beyond this edge 18. In its deployed state ST1, the head airbag 13 lies between the side window 4 and the head K1 of the passenger.

The thorax protection module 12 comprises a thorax airbag 19 designed as an inflatable cushion, which is shown here drawn in its inflated state ST2, in which it is positioned between the lateral structure 3' or the interior paneling 15 and the chest region BR of the passenger. The thorax airbag 19 is activated from a second inflation device 20, specifically a gas generator. The thorax airbag 19 and the head airbag 13 are preferably activated together in the event of a vehicle collision. This can take place in the event of a side impact or also in the event of a front and/or rear collision, if applicable with a partial offset, and/or if the motor vehicle 1 rotates on its vertical axis and/or if the vehicle rolls over or nearly rolls over. Naturally, the head airbag 13 or the thorax airbag 19 may also be activated alone; a successive activation of the two airbags 13 and 19, with or without a time delay, is also possible. The activation of the airbags 13 and 19 is controlled by a control device not shown here, which receives a signal from at least one sensor (not illustrated).

The thorax protection module 12 is positioned within a recess inside the seat back 8, adjacent to the lateral structure 3' or the side door 3, wherein the deployment opening for the thorax airbag 19 lies in the side wall of the seat back 21 that faces the lateral structure 3' or side door 3, and is closed off by a cover 22, which is moved out of the way or opened only upon activation of the thorax airbag 19, for example, thus uncovering the deployment opening in the thorax protection module 12 or in the side wall of the seat back 21. Beginning from its collapsed ready state inside the seat back 8, upon activation the thorax airbag 19 will exit the deployment opening essentially toward the front (Arrow 23), and will extend further forward (in the direction of travel FR or parallel to the longitudinal direction of the vehicle), essentially parallel to the lateral structure 3' along the interior paneling 15, until it reaches its inflated or deployed state ST2. In this state, the upper edge 24 of the thorax airbag 19 lies adjacent to the breastwork 16 or to the lower edge 13' or the area of deployment of the head airbag 13, which area of deployment lies between the interior paneling 15 and the sheet panel inside the door (not illustrated here) that lies behind said paneling, inside the breastwork 16, as a result of the folding back of the interior paneling 15. The two airbags 13 and 19 thus form an essentially continuous protection against side impacts. The upper edge 24 extends up to the breastwork 16 or up to the lower edge 13', or lies a slight distance below this, as is shown in the drawing, or extends above the breastwork 16, so that it may overlap slightly with the head airbag 13. The lower edge 24' of the thorax airbag 19 can extend—as indicated by the dotted lines—up to the passenger's pelvic region BI.

The deployment opening for the thorax airbag 19 opened up by the cover 22 lies below the level of the breastwork 16 of the lateral structure 3', and the thorax airbag 19 is deployed at an upward angle (Arrow 25) in order for its upper edge 24 to reach the breastwork 16. In the exemplary embodiment shown, the thorax airbag 19—viewed from the side—has an essentially semicircular or oval shape, and is attached at its fastened end 19' to the thorax protection module 12. Preferably, the upper edge 24 follows, at least partially and approximately, an imaginary circle KS, which—and thus partially the edge 24 as well—extends around the pivoting axis 8' of the seat back 8, preferably concentrically, whereby the edge 24 will come to rest next to the breastwork 16, regardless of the angle of inclination $\alpha$ of the seat back, when the thorax airbag 19 is brought to its inflated state ST 2.

Due to the deep positioning of the vehicle seat 5, as is customary with sports cars, the airbag 13 that is deployed from the breastwork 16 can act only as a head airbag and can protect only this part of the passenger. In order to further protect the shoulder area and at least the thorax, the thorax airbag 19 is provided, which extends up to the breastwork 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A motor vehicle comprising:
   a body structure that has a lateral structure,
   a vehicle seat that is fastened to the body structure, and
   a side impact protection device for a passenger in the vehicle, the side impact protection device including a head airbag, with a first inflation device that can deploy upward in a region of a breastwork of the lateral structure, and a side airbag, with a second inflation device that can deploy laterally from the seat,
   wherein the side airbag is designed as a thorax airbag which, in a ready position, is arranged, together with the second inflation device, inside a seat back of the vehicle seat, and which can deploy out of a side wall of the seat back essentially toward a front, and
   wherein, when the thorax airbag is in its deployed state, its upper edge comes to rest next to the breastwork of the lateral structure, and
   wherein the head airbag with the first inflation device is positioned directly below the breastwork.

2. A motor vehicle comprising:
   a body structure that has a lateral structure,
   a vehicle seat that is fastened to the body structure, and
   a side impact protection device for a passenger in the vehicle, the side impact protection device including a head airbag, with a first inflation device that can deploy upward in a region of a breastwork of the lateral structure, and a side airbag, with a second inflation device that can deploy laterally from the seat, wherein the side airbag is designed as a thorax airbag which, in a ready position, is arranged, together with the second inflation device, inside a seat back of the vehicle seat, and which can deploy out of a side wall of the seat back essentially toward a front, wherein, when the thorax airbag is in its deployed state, its upper edge comes to rest next to the breastwork of the lateral structure, and wherein the seat back is tilt adjustable, and wherein the upper edge at least partially follows an imaginary circle, which runs around a pivoting axis of the tilt adjustable seat back.

3. The motor vehicle according to claim 2, wherein the imaginary circle and thus in part the upper edge extend in sections concentrically around the pivoting axis of the seat back.

4. A motor vehicle comprising:

a body structure that has a lateral structure, a vehicle seat that is fastened to the body structure, and a side impact protection device for a passenger in the vehicle, the side impact protection device including a head airbag, with a first inflation device that can deploy upward in a region of a breastwork of the lateral structure, and a side airbag, with a second inflation device that can deploy laterally from the seat, wherein the side airbag is designed as a thorax airbag which, in a ready position, is arranged, together with the second inflation device, inside a seat back of the vehicle seat, and which can deploy out of a side wall of the seat back essentially toward a front, wherein, when the thorax airbag is in its deployed state, its upper edge comes to rest next to the breastwork of the lateral structure, and wherein the head airbag deploys from the breastwork only upward and parallel to a side window.

5. A motor vehicle comprising:

a body structure that has a lateral structure, a vehicle seat that is fastened to the body structure, and a side impact protection device for a passenger in the vehicle, the side impact protection device including a head airbag, with a first inflation device that can deploy upward in a region of a breastwork of the lateral structure, and a side airbag, with a second inflation device that can deploy laterally from the seat, wherein the side airbag is designed as a thorax airbag which, in a ready position, is arranged, together with the second inflation device, inside a seat back of the vehicle seat, and which can deploy out of a side wall of the seat back essentially toward a front, wherein, when the thorax airbag is in its deployed state, its upper edge comes to rest next to the breastwork of the lateral structure, wherein a deployment opening for the thorax airbag lies below a level of the breastwork on the side wall of the seat back, on a thorax protection module, or both below the level of the breastwork on the side wall of the seat back and on the thorax protection module, and wherein the head airbag with the first inflation device is positioned directly below the breastwork.

6. A motor vehicle comprising:

a body structure that has a lateral structure, a vehicle seat that is fastened to the body structure, and a side impact protection device for a passenger in the vehicle, the side impact protection device including a head airbag, with a first inflation device that can deploy upward in a region of a breastwork of the lateral structure, and a side airbag, with a second inflation device that can deploy laterally from the seat, wherein the side airbag is designed as a thorax airbag which, in a ready position, is arranged, together with the second inflation device, inside a seat back of the vehicle seat, and which can deploy out of a side wall of the seat back essentially toward a front, wherein, when the thorax airbag is in its deployed state, its upper edge comes to rest next to the breastwork of the lateral structure, wherein a deployment opening for the thorax airbag lies below a level of the breastwork on the side wall of the seat back, on a thorax protection module, or both below the level of the breastwork on the side wall of the seat back and on the thorax protection module, wherein the thorax airbag can deploy out of the deployment opening, at an upward angle, in the direction of the breastwork, and wherein the head airbag with the first inflation device is positioned directly below the breastwork.

7. A side impact protection device for a motor vehicle having a body structure that has a lateral structure, a vehicle seat that is fastened to the body structure, and a side impact protection device for a passenger in the vehicle, the side impact protection device comprising:

a head airbag, with a first inflation device that can deploy upward in a region of breastwork of the lateral structure, and a side airbag, with a second inflation device that can deploy laterally from the seat, wherein the side airbag is designed as a thorax airbag which, in a ready position, is arranged, together with the second inflation device, inside a seat back of the vehicle seat, and which can deploy out of a side wall of the seat back essentially toward a front, wherein, when the thorax airbag is in its deployed state, its upper edge comes to rest next to the breastwork of the lateral structure, wherein the seat back is tilt adjustable, and wherein the upper edge at least partially follows an imaginary circle, which runs around a pivoting axis of the tilt adjustable seat back.

8. The device according to claim 7, wherein the imaginary circle and thus in part the upper edge extend in sections concentrically around the pivoting axis of the seat back.

* * * * *